United States Patent [19]

Backhouse et al.

[11] 4,340,511

[45] Jul. 20, 1982

[54] PRODUCTION OF POLYMER MICROPARTICLES AND COATING COMPOSITIONS CONTAINING THEM

[75] Inventors: Alan J. Backhouse, South Ascot; Auguste L. Palluel, Windsor, both of England

[73] Assignee: Imperial Chemical Industries Limited, London, England

[21] Appl. No.: 53,850

[22] Filed: Jul. 2, 1979

[30] Foreign Application Priority Data

Jul. 19, 1978 [GB] United Kingdom ............... 30356/78

[51] Int. Cl.$^3$ ..................... C08F 265/06; C08G 81/00; C08L 51/08; C08L 61/28
[52] U.S. Cl. ..................................... 524/504; 525/69; 525/162; 525/450; 525/518; 524/505; 524/512; 524/542
[58] Field of Search ................. 525/450, 519, 518, 69, 525/450; 260/15

[56] References Cited

U.S. PATENT DOCUMENTS

| | | | |
|---|---|---|---|
| 3,365,414 | 1/1968 | Fisk et al. | 525/519 |
| 3,514,500 | 5/1970 | Osmond et al. | 525/450 |
| 3,736,279 | 5/1973 | Camelon et al. | 525/518 |
| 3,812,075 | 5/1974 | Burdett et al. | 525/518 |
| 3,907,741 | 9/1975 | Maker et al. | 525/519 |
| 3,909,479 | 9/1975 | Wright et al. | 525/519 |
| 3,923,723 | 12/1975 | Klein | 525/450 |
| 3,950,284 | 4/1976 | Fukuda et al. | 260/33.6 R |
| 3,966,667 | 6/1976 | Sullivan et al. | 260/33.6 UA |
| 3,981,839 | 9/1976 | Asher et al. | 525/450 |
| 3,996,309 | 12/1976 | Dowbenko et al. | 525/450 |
| 4,115,472 | 9/1978 | Porter et al. | 260/33.6 UB |

Primary Examiner—John C. Bleutge
Assistant Examiner—A. H. Koeckert
Attorney, Agent, or Firm—Cushman, Darby & Cushman

[57] ABSTRACT

Crosslinked addition polymer microparticles are produced by dispersion polymerization of monomers in an aliphatic hydrocarbon liquid in the presence of a dispersion stabilizer and also of a specified type of amino resin which is insoluble in the hydrocarbon liquid, at least one of the monomers polymerized carrying a group which can react with the amino resin under the conditions of polymerization. Coating compositions having improved application characteristics and/or giving improved film properties are obtained by dispersing the microparticles in combinations of suitable film-forming polymers and diluents.

11 Claims, No Drawings

PRODUCTION OF POLYMER MICROPARTICLES AND COATING COMPOSITIONS CONTAINING THEM

This invention relates to crosslinked polymer microparticles, to a process for making such particles and to coating compositions containing the particles.

The preparation of polymeric microparticles and their incorporation into coating compositions comprising a film-forming polymer have been described, for example in British Pat. Nos. 967,051; 1,242,051; 1,451,948 and 1,538,151, and in U.S. Pat. No. 4,025,474. In certain of these publications the particles in question are referred to as "microgel" particles, in which case the polymer of which the particles are composed is crosslinked to a greater or lesser extent and thereby rendered insoluble in any inert liquid diluent in which the film-forming polymer of the coating composition may be carried (although it may be swollen by that diluent). In other instances, the microparticles may be non-crosslinked and retain their identity in the coating composition by reason of the polymer of which they are composed being inherently insoluble in the diluent.

In general, such microparticles are made by processes of emulsion or dispersion polymerisation of monomers in suitable liquids in the presence of stabilising entitles for the particles which are formed, whereby the particles are prevented from flocculating or aggregating. Where aqueous emulsion polymerisation processes are used, the resulting microparticles are normally charge-stabilised in the manner well known in the art. Where processes of dispersion polymerisation in non-aqueous liquids are employed, the microparticles are sterically stabilised in the manner described in "Dispersion Polymerisation in Organic Media", ed. K. E. J. Barrett (John Wiley, 1975) and in many patent specifications such as British Specifications Nos. 934,038; 941,305; 1,052,241; 1,122,397; 1,143,404 and 1,231,614. Where the microparticles are required to be cross-linked, this may be achieved in various ways. One procedure is to include, in the monomers being polymerised, material which is polyfunctional with respect to the polymerisation reaction, for example, in the case where vinyl-type monomers are involved, by including a comonomer containing two or more ethylenically unsaturated groups. In a variant of this procedure, applicable to the case where a dispersion polymerisation process involving a steric stabiliser is used, the polyfunctionality with respect to the polymerisation reaction is provided in the stabiliser either additionally to, or instead of, its being provided in the monomers themselves.

A different way of bringing about cross-linking of the microparticles consists in introducing, into the monomer charge being polymerised, two comonomers carrying between them pairs of mutually chemically reactive groups, in addition to the polymerisable unsaturated groups, by reaction of which groups covalent cross-links between the polymer chains may be generated. A variety of such pairs of mutually reactive groups has been proposed, for example epoxy and carboxyl, amine and carboxyl, epoxide and carboxylic anhydride, amine and carboxylic anhydride, hydroxyl and carboxylic anhydride, amine and carboxylic acid chloride, alkylene-imine and carboxyl, and organoalkoxysilane and carboxyl.

We have now found that, in the preparation of cross-linked polymer microparticles by dispersion polymerisation techniques, cross-linking of the polymer can advantageously be effected if the polymerisation is carried out in the presence of a reactive amino resin which is insoluble in the liquid in which the dispersion is to be formed, and the monomers being polymerised include at least one bearing a group capable of reacting with the amino resin.

According to the present invention there is provided a process for the production of cross-linked addition polymer microparticles, comprising the dispersion polymerisation of ethylenically unsaturated monomers in an aliphatic hydrocarbon liquid which is a solvent for the monomers but is a non-solvent for the polymer produced, in the presence of a dispersion stabiliser the molecule of which comprises at least one polymeric component which is solvated by the hydrocarbon liquid and at least one other component which is not solvated by the liquid and is capable of associating with the polymer produced, characterised in that (i) there is present in the hydrocarbon liquid a reactive amino resin as hereinafter defined which is insoluble in the hydrocarbon liquid and (ii) at least one of the ethylenically unsaturated monomers carries a group which is capable of reacting with the amino resin, the polymerisation conditions being so chosen that during the polymerisation of the monomer or monomers the said group reacts with the amino resin so as to effect cross-linking of the addition polymer chains.

By a "reactive amino resin" is meant herein a condensate of formaldehyde with an amino group-containing substance which has subsequently been reacted with a lower alcohol so as to convert at least a proportion of the —NH.CH$_2$OH (hydroxymethylamino) groups resulting from the formaldehyde condensation into —NH.CH$_2$OR (alkoxymethylamino) groups, where R is an alkyl group containing from 1 to 4 carbon atoms. Formaldehyde condensates of this type are well known to be derived from a variety of substances containing amine groups, in particular from urea, thiourea, melamine or benzoguanamine, and it is also well known to convert these condensates to the corresponding alkyl ethers by reaction with alcohols ranging from methanol to butanol. For the purposes of the present invention, reactive amino resins are restricted to those members of the class which are of low solubility in aliphatic hydrocarbons, namely those having a mineral spirit tolerance of less than 100 as measured according to ASTM D1198-73, and which also have a molecular weight of less than 2000.

Ethylenically unsaturated monomers suitable for use in the process of the invention include especially the acrylic monomers, that is to say the alkyl esters of acrylic acid or methacrylic acid, such as methyl methacrylate, ethyl methacrylate, propyl methacrylate, butyl methacrylate, ethyl acrylate, butyl acrylate and 2-ethylhexylacrylate. As already indicated, at least one of the monomers being polymerised must carry a group which is capable of reacting with the amino resin. The preferred group which is reactive in this way is a hydroxyl group, but other suitable groups include carboxyl and carboxylic amide groups. All of these groups are capable, under appropriate conditions, of reacting with N-methylol or N-alkoxymethyl groupings which are present in the amino resin, with the formation of a covalent linkage. Suitable monomers of the acrylic type carrying such groups include acrylic acid and methacrylic acid, their amides and their hyroxyalkyl esters such as hydroxyethyl acrylate, hydroxyethyl methacrylate and 2-hydroxypropyl methacrylate. If desired, the monomers being polymerised may consist exclusively of these monomers carrying groups which are reactive with the amino resin, but normally the latter are preferably copolymerised together with one or more of the acrylic monomers not carrying reactive groups, which have been referred to above. Alternatively, or in addition, they may be copolymerised with other ethylenically unsaturated monomers not of the acrylic type, for example vinyl acetate, vinyl propionate, acrylonitrile, styrene and vinyltoluene.

Where the monomer carrying a reactive group is one of the hydroxy monomers mentioned above, it may be advantageous at the same time to include a carboxyl-bearing monomer in addition, since the carboxyl groups thereby provided can catalyse the cross-linking reaction between the addition polymer chains and the amino resin.

Preferably the monomers being polymerised include from 1% to 20% by weight, based on the total monomer charge, of one or more hydroxyl group-carrying monomers, and from 1% to 5% by weight, on the same basis, of a carboxyl group-carrying monomer.

It is necessary that the monomers being polymerised should be soluble in the aliphatic hydrocarbon which is employed as the continuous phase in which the polymer microparticles are produced, but this condition will normally be satisfied by any of the monomers named in the description above.

Suitable aliphatic hydrocarbons for use in the process of the invention include hexane, heptane and mixed petroleum fractions of various boiling point ranges which are predominantly aliphatic in nature but may contain minor proportions of aromatic hydrocarbons. Conveniently the aliphatic hydrocarbon or hydrocarbon mixture is chosen to have a boiling point lying in the optimum temperature range for polymerisation of the ethylenically unsaturated monomers, so that the polymerisation can be conducted under reflux conditions. A suitable such temperature for many common acrylic monomers is in the region of 100° C.

According to the invention, the polymer microparticles are produced by a process of dispersion polymerisation of the monomers in the presence of a dispersion stabiliser which has the ability to stabilise the microparticles against flocculation or aggregation, as they are formed, by the provision of a steric barrier surrounding the microparticles. The dispersion stabiliser may be a pre-formed substance which is dissolved in the hydrocarbon liquid in which the monomers are to be polymerised, or it may be formed in situ during the polymerisation from a polymeric precursor which is soluble in the hydrocarbon liquid and which undergoes copolymerisation or grafting with a portion of the monomers being polymerised. Such dispersion polymerisation processes are well known and are extensively described in the literature to which reference has been made above.

In all such dispersion polymerisation processes, the amphipathic stabilising agent is a substance the molecule of which contains a polymeric component which is solvatable by the liquid in which the dispersion is made and another component which is relatively non-solvatable by that liquid and is capable of associating with the polymer particles produced. Such a stabilising agent will be soluble as a whole in the dispersion liquid, but the resulting solution will usually contain both individual molecules and micellar aggregates of molecules, in equilibrium with each other. The type of stabilising agent preferred for use in the invention is a block or graft copolymer containing two types of polymeric component: one type consists of polymer chains which are solvatable by the hydrocarbon liquid and the other type consists of polymer chains of different polarity from those of the first type which accordingly are not solvatable by that liquid and are capable of becoming anchored to the polymer microparticles. A particularly useful form of such a stabilising agent is a graft copolymer comprising a polymer backbone, which is the non-solvatable or "anchor" component, and a plurality of solvatable polymer chains pendant from the backbone. Specific examples of such graft copolymers include those in which the backbone is an acrylic polymer chain, derived predominantly from methyl methacrylate, and the pendant chains are residues of poly(12-hydroxystearic acid) which are readily solvatable by an aliphatic hydrocarbon medium. These copolymers may be made, for example, by first reacting poly(12-hydroxystearic acid) with glycidyl acrylate or glycidyl methacrylate, whereby the terminal —COOH group in the polymeric acid is converted to an ester derivative containing a polymerisable unsaturated grouping, and then copolymerising that derivative with methyl methacrylate, optionally together with minor proportions of other copolymerisable monomers. By employing acrylic acid or methacrylic acid as such minor comonomers, it is possible to introduce carboxyl groups into the backbone chain of the graft copolymer with beneficial results inasmuch as the backbone is thereby rendered more polar than it is if composed of methyl methacrylate units alone. This increased polarity causes the backbone to be even less solvatable by an aliphatic hydrocarbon, and in consequence enhances the force whereby it becomes anchored to the microparticles.

The successful operation of the process of the invention depends upon the amino resin having a greater tendency to become incorporated into the polymer microparticles as they are formed than it has to remain in the hydrocarbon liquid in which the microparticles are dispersed. The amino resins which are preferred for use are accordingly those which, whilst conforming to the definition given earlier, have a greater tendency to react with the hydroxyl group or other reactive group present in the monomer or monomers being polymerised than they have to react with themselves, i.e. to self-condense. In general, this condition is met most satisfactorily by the methyl ethers of the formaldehyde condensates, that is to say those containing methoxymethylamino groups, and more particularly by such ethers in which most or all of the hydroxymethylamino groups have been etherified. Thus, examples of preferred amino resins include hexamethoxymethyl melamine, tetramethoxymethyl urea, tetramethoxymethyl benzoguanamine, and the fully methylated low molecular weight further condensates of formaldehyde with melamine, urea or benzoguanamine. It is possible for a proportion of the etherifying groups to be derived from higher alcohols such as ethanol, isopropanol and n-butanol but this proportion will be limited by the afore-mentioned requirement that the mineral spirit tolerance of the amino resin should be less than 100 as measured by ASTM D1198-73. Most preferably, the mineral spirit tolerance of the resin is less than 50 as measured by that method.

As already stated, the molecular weight of the amino resin should be less than 2000, and preferably it should be less than 1000. This limitation ensures that the resin is of a low degree of condensation in terms of the number of units of melamine, urea, etc. per molecule, and that accordingly it is capable of forming a dispersion or emulsion in the hydrocarbon liquid in the presence of the polymeric dispersion stabiliser and the polymerising monomers. Depending upon the magnitude of the standing monomer concentration in the polymerising mixture, it is possible that part of the amino resin may actually be in a state of solution therein in the early stages of the polymerisation, but, as the monomer content falls on conversion to polymer, the solvency of the mixture for the resin will decrease and the whole of the resin will ultimately be incorporated into the microparticles and become reacted with the polymer of which they are composed.

The amount employed of the amino resin is preferably from 0.5% to 20% by weight of the total reactive constituents of the polymerisation mixture.

If desired, the polymerisation mixture may also contain a catalyst for the cross-linking reaction between the addition polymer and the amino resin. Examples of such catalysts include p-toluene sulphonic acid, methanesulphonic acid, acid butyl maleate and acid butyl phosphate.

However, as already indicated, catalysis of the cross-linking reaction can adequately be effected by arranging for the monomers to be polymerised to contain a minor proportion of one carrying carboxyl groups, for example acrylic acid. This method of catalysis is usually to be preferred over the use of an "external" catalyst, which may adversely affect the storage stability of a coating composition incorporating the microparticles, of the kind described below. An unsaturated acid in the un-polymerised state normally has a high dissociation constant and so is able to act as a good cross-linking catalyst, whilst once it has become copolymerised with the other monomers its dissociation constant falls and its continued presence thereafter is unlikely to cause instability of this sort.

By the above-described procedure, dispersions in hydrocarbon liquids may be obtained in which the cross-linked polymer microparticles of the disperse phase are of a size from 0.1 to 0.5 microns.

The chemical composition and degree of cross-linking of the microparticle polymer may be such that it has a Tg (glass-rubber transition temperature) below room temperature, in which case the microparticles will be rubbery in nature, or alternatively the Tg may be above room temperature, in which case the microparticles will be hard and glassy. Of the unsaturated monomers mentioned above, methyl methacrylate is an appropriate choice where it is desired that the polymer microparticles should have a high Tg value. Where the microparticles are required to be of low Tg, ethyl acrylate or vinyl acetate may be used, but it may be a more convenient alternative to copolymerise methyl methacrylate with minor proportions of "softening" monomers such as butyl acrylate or butyl methacrylate. It is preferred, however, that these softening monomers do not exceed 15% by weight of the total monomer composition; otherwise, there is a risk that the resulting polymer may be too soluble, even in a low-polarity hydrocarbon liquid, for dispersion polymerisation to give rise to a stable dispersion of microparticles. Certain other softening monomers, such as 2-ethoxyethyl acrylate or 2-ethoxyethyl methacrylate, may be used in proportions greater than 15% if desired, but these are not as readily accessible as the corresponding lower alkyl esters.

Polymer microparticles made according to the process of the invention are of value for incorporation into coating compositions in order to modify the characteristics, in particular the spray application properties, of the latter.

The application of coating compositions by a spraying technique is of especial importance in the automobile industry, and compositions presently available for this purpose are subject to two kinds of shortcoming. One such drawback arises in the case of the compositions which contain metallic flake pigments; these are the so-called "glamour metallic" finishes whereby a differential light reflection effect, depending upon the viewing angle, is achieved. Maximisation of this "flip" tone effect requires a high degree of control over the orientation of the metallic flake during the laying down and the curing of the coating film, and this in turn calls for careful formulation of the composition which is applied to the substrate in regard to both the film-forming resin and the liquid medium in which it is carried. Difficulties may be encountered in meeting this objective and at the same time achieving a high degree of gloss in the final finish such as is usually desired in the automotive field. We have now found that improved control of the metallic pigment in a coating composition of this type, whereby good "flip" effect may be ensured, is obtained when the composition includes a proportion of polymer microparticles according to the present invention.

Another drawback arises in coating compositions containing conventional pigments, used for the production of so-called "solid colour" finishes upon automobile bodies, in which the need to achieve good flow-out of the coating after spray application, in order to maximise gloss, may be difficult to reconcile with the prevention of excessive flow of the composition during the spraying operation in order that the phenomenon known as "sagging" or "running" may be avoided, especially at sharp edges or corners of a substrate of complicated shape. We find that by incorporating polymer microparticles according to the invention in such compositions, it is possible to apply by spraying a coating of adequate thickness for complete obliteration of the substrate without any tendency for sagging to occur, and yet subsequent flow-out of the coating is unimpaired and a high gloss finish is obtained.

Thus according to a further feature of the invention there is provided a coating composition comprising (A) a film-forming polymer, (B) a volatile organic liquid diluent in which the polymer is carried, and (C) cross-linked polymer microparticles as hereinbefore defined which are insoluble in and stably dispersed in the combination of the polymer (A) and the diluent (B).

The film-forming polymer constituent (A) of the coating composition according to the invention may be any of the polymers known to be useful in coating compositions. One suitable class of polymer consists of those which are derived from one or more ethylenically unsaturated monomers. Particularly useful members of this class are the acrylic addition polymers which are well-established for the production of coatings in the automobile industry, that is to say polymers or copolymers of one or more alkyl esters of acrylic acid or methacrylic acid, optionally together with other ethylenically unsaturated monomers. These polymers may be of either the thermoplastic type or the thermosetting, cross-linking type. Suitable acrylic esters for either type of polymer include methyl methacrylate, ethyl methacrylate, propyl methacrylate, butyl methacrylate, ethyl acrylate, butyl acrylate and 2-ethylhexyl acrylate. Suitable other, copolymerisable monomers include vinyl acetate, vinyl propionate, acrylonitrile, styrene and vinyl toluene. Where the polymer is required to be of the cross-linking type, suitable functional monomers to be used in addition to the latter include acrylic acid, methacrylic acid, hydroxyethyl acrylate, hydroxyethyl methacrylate, 2-hydroxypropyl acrylate, 2-hydroxypropyl methacrylate, N-(alkoxymethyl) acrylamides and N-(alkoxymethyl) methacrylamides, where the alkoxy groups may be, for example, a butoxy group, glycidyl acrylate and glycidyl methacrylate. The coating composition may in such a case contain also a cross-linking agent of known type such as a diisocyanate, a diepoxide, or, especially, an amino resin of the same general class which has been described above in connection with the polymer microparticles but not subject to the mineral spirit tolerance or molecular weight limitations prescribed for the latter. Particularly suitable cross-linking agents are melamine-formaldehyde condensates in which a substantial proportion of the methylol groups have been etherified by reaction with butanol.

For the purposes of the foregoing general definition of the invention, the cross-linking agent, where present, is considered as being a part of the film-forming polymer (A).

The coating composition may incorporate a suitable catalyst for the cross-linking reaction between the acrylic polymer and the cross-linking agent, for example an acid-reacting compound such as acid butyl maleate, acid butyl phosphate or p-toluene sulphonic acid. Alternatively the catalytic action may be supplied by the incorporation of free acid groups in the acrylic polymer, for example by the use of acrylic acid or methacrylic acid as comonomer in the preparation of the polymer.

The acylic polymer may be prepared by solution polymerisation of the monomer(s), in the presence of suitable catalysts or initiators such as organic peroxides or azo compounds, e.g. benzoyl peroxide or azodiisobutyronitrile. Conveniently the polymerisation may be carried out in the same organic liquid that is to form the diluent constituent (B) of the coating composition, or in a liquid which is to form a part of that diluent. Alternatively the acrylic polymer may be prepared in a separate previous operation (e.g. by aqueous emulsion polymerisation) and then dissolved in a suitable organic liquid.

Other suitable members of the class of polymer derived from ethylenically unsaturated monomers are vinyl copolymers, that is to say copolymers of vinyl esters of inorganic or organic acids, for example, vinyl chloride, vinyl acetate and vinyl propionate; the copolymers may optionally be partially hydrolysed so as to introduce vinyl alcohol units. An example of such a copolymer is that containing 91% vinyl chloride, 6% vinyl alcohol and 3% vinyl acetate by weight, sold commercially by Union Carbide Corporation under the name "Vinylite VAGH".

Instead of being a polymer derived from ethylenically unsaturated monomers, the polymer constituent (A) of the composition may be a film-forming polyester resin, by which term we mean any of those resins which are known in the art for use in surface coating compositions and which are essentially the products of condensation of polyhydric alcohols and polycarboxylic acids. We include in this term the alkyd resins which are obtained from such starting materials with the addition of constituents supplying residues of fatty acids derived from natural drying oils, or semi-drying oils, or even oils having no air-drying capabilities. We also include polyester resins not incorporating any natural oil residues. All these resins normally contain a proportion of free hydroxyl and/or carboxyl groups which are available for reaction with suitable cross-linking agents, such as those discussed above in connection with acrylic polymers. Where a cross-linking agent is employed, this is, for the purposes of the present invention, again considered to be a part of the film-forming constituent (A).

Suitable polyhydric alcohols for the production of polyester resins include ethylene glycol, propylene glycol, butylene glycol, 1:6-hexylene glycol, neopentyl glycol, diethylene glycol, triethylene glycol, tetraethylene glycol, glycerol, trimethylolpropane, trimethylolethane, pentaerythritol, dipentaerythritol, tripentaerythritol, hexane triol, oligomers of styrene and allyl alcohol (for example that sold by Monsanto Chemical Company under the designation RJ 100) and the condensation products of trimethylolpropane with ethylene oxide or propylene oxide (such as the products well known commercially as "Niax" triols). Suitable polycarboxylic acids include succinic acid (or its anhydride), adipic acid, azelaic acid, sebacic acid, maleic acid (or its anhydride), fumaric acid, muconic acid, itaconic acid, phthalic acid (or its anhydride), isophthalic acid, terephthalic acid, trimellitic acid (or its anhydride), and pyromellitic acid (or its anhydride). Where it is desired to produce air-drying alkyd resins, suitable drying oil fatty acids which may be used include those derived from linseed oil, soya bean oil, tall oil, dehydrated castor oil, fish oils or tung oil. Other oil fatty acids, of semi-drying or non-drying types, which may be used include those derived from safflower oil, sunflower oil and cottonseed oil. Normally it is preferred that the oil length of such an alkyd resin should not exceed 50%. Monofunctional saturated carboxyl acids may also be incorporated in order to confer plasticity on the polyester. Such acids may be, for example, $C_4-C_{20}$ saturated aliphatic acids, benzoic acid, p-tert-butyl benzoic acid and abietic acid; these may, in fact, be the only fatty acids present, in those cases where the polyester resin is to be cured by subsequent reaction of residual hydroxyl or carboxyl groups with a cross-linking agent. In addition, monofunctional hydroxy compounds may be incorporated in order to control the chain length of the polyester or to confer certain desirable compatibility properties upon it; suitable monohydroxy compounds include benzylalcohol, cyclohexyl alcohol, saturated or unsaturated fatty alcohols and condensation products of ethylene oxide or propylene oxide with monofunctional alcohols (e.g. the methoxypolyethylene glycol obtained by reaction of ethylene oxide with methanol).

Suitable film-forming polyester resins also include "modified" alkyd resins, for example styrenated or methacrylated alkyds, urethane alkyds and epoxy alkyds.

As a further alternative, the polymer constituent (A) of the coating composition may be a cellulose ester, such as cellulose acetate butyrate or cellulose nitrate. In particular there may be mentioned as being suitable the grade of cellulose acetate butyrate marketed by Eastman Kodak and designated EAB 531-1, having an acetyl content of 3% and a butyryl content of 50% and a viscosity of 1–2 seconds as measured by ASTM Method D-1343154T.

Yet another type of polymer which may be employed as the constituent (A) comprises the amino resins, which have already been described in the role of cross-linking agents for acrylic polymers or polyester resins of the thermosetting type. These same amino resins can be employed as film-forming materials in their own right and, for this purpose, the preferred resins are again melamine-formaldehyde condensates in which a substantial proportion of the methylol groups are etherified by reaction with butanol. In order to assist curing of the resin, there will preferably also be incorporated in the base-coat composition a suitable catalyst, such as one of those already described. From what has been said above, it will be clear that there may also be employed as the film-forming constituent (A) a mixture of a thermosetting acrylic polymer or polyester resin and a nitrogen resin in such proportions that part of the latter functions as cross-linking agent and part as a supplementary film-former in its own right.

According to one embodiment of this further feature of the invention, the film-forming polymer (A) is in a state of stable dispersion in the diluent liquid (B), which in such a case will be a non-solvent for the polymer. Methods of preparing such polymer dispersions are well-known in the art and have been referred to above in connection with the production of the polymer microparticles (C).

In another embodiment, the film-forming polymer (A) is dissolved in the diluent (B); the polymer may then be prepared by solution polymerisation of the constituent monomer or monomers, in the presence of suitable catalysts or initiators where necessary. Conveniently the polymerisation may be carried out in the same organic liquid that is to provide the diluent (B), or in a liquid which is to form part of that diluent. Alternatively the polymer (A) may be prepared in a separate previous operation (e.g., in the case of an acrylic polymer, by aqueous emulsion polymerisation of monomer or, in the case of a polyester resin, by melt polymerisation) and then dissolved in a suitable organic liquid.

In yet another embodiment, the film-forming polymer (A) may be partly in dispersion and partly in solution in the diluent (B).

The volatile organic liquid constituent (B) of the coating composition may be any of the liquids, or mixtures of liquids, which are conveniently used as polymer solvents in coating compositions, for example aliphatic hydrocarbons such as hexane and heptane, aromatic hydrocarbons such as toluene and xylene, and petroleum fractions of various boiling point ranges which are predominantly aliphatic but have a significant aromatic content, esters such as butyl acetate, ethylene glycol diacetate and 2-ethoxyethyl acetate, ketones such as acetone and methyl isobutyl ketone, and alcohols such as butyl alcohol. The actual liquid or mixture of liquids selected as the diluent (B) will depend upon the nature of the film-forming polymer (A), according to principles which are well-known in the coatings art, in order that the polymer shall be either soluble or insoluble in the diluent as the case may require.

By virtue of their cross-linked nature, the polymer microparticles (C) will be insoluble in the combination of the film-forming polymer (A) and the liquid diluent (B) irrespective of the nature of the latter constituents and of whether the polymer (A) is in solution or dispersion in the diluent (B). However, it is possible, when the diluent is of a polar nature, that the microparticles may be more or less extensively swollen in contact with it.

The incorporation of the polymer microparticles (C) into the combination of the film-forming polymer (A) and the liquid diluent (B) in order to form a coating composition according to the invention may be accomplished in various ways. Thus the dispersion of the microparticles in an aliphatic hydrocarbon obtained by the process hereinabove described may be directly blended with a solution or dispersion of the polymer (A) in the diluent (B). Alternatively, the microparticles may be separated from the dispersion in which they are made, for example by centrifuging, filtration or spray-drying, and then blended with a solution or dispersion of the polymer (A) in the diluent (B). Although in either case the polymer microparticles may be employed in the form in which they are produced by the dispersion polymerisation process previously referred to, it may be advantageous to subject the microparticles so obtained to a further treatment before they are incorporated into the coating composition of the invention. As already indicated, the microparticles are produced in dispersion in an aliphatic hydrocarbon. From the foregoing discussion it may, however, be anticipated that steric stabilising agents which are suitable for stabilising the microparticles in a simple low polarity liquid environment will not always effectively stabilise them when they are transferred to the environment of the combination of the film-forming polymer (A) in the liquid diluent (B). This does in fact prove to be the case in certain circumstances, for example where the diluent (B) is relatively highly polar or where the polymer (A) is poorly compatible with the stabilising chains present on the microparticles, resulting in the formation of "bits" in the blend obtained or, at worst, gross flocculation or aggregation of the microparticles. It is possible, alternatively, for such destabilisation to occur subsequently, after application of the total coating composition to a substrate, with the production of films exhibiting poor gloss.

In order to overcome or mitigate these effects, it is a preferred feature of the invention that microparticles which have been made by the dispersion polymerisation process previously described are further associated with a polymer which is soluble in the volatile organic liquid constituent (B) of the coating composition and is also compatible with the film-forming polymer constituent (A). This further polymer, hereinafter referred to as the "auxiliary" polymer, is essentially non-cross-linked. The microparticles are most conveniently brought into association with the auxiliary polymer by following up the dispersion polymerisation process immediately with the polymerisation in the dispersion of further monomer, from which the auxiliary polymer is to be derived, in the original inert liquid medium and in the presence of the original stabilising agent. If desired, further stabilising agent may be added at this stage.

In general, the auxiliary polymer will be required to have a composition such that it is compatible with the film-forming polymer (A), including any cross-linking agent for the polymer; indeed it may be identical with that polymer and, in certain circumstances as described below, even wholly replace it. The monomer or monomers from which the auxiliary polymer is to be derived will be chosen with this requirement in mind, as will be apparent to those skilled in the art.

On introducing the microparticles so treated into the combination of the polymer (A) in the liquid (B), part of the auxiliary polymer may be dissolved away by that medium where it is of relatively high polarity, but this does not detract from the effectiveness of the auxiliary polymer in preventing severe flocculation or aggregation. If desired, the association of the auxiliary polymer with the microparticles may be enhanced by ensuring that covalent linkages are developed between the chains of the auxiliary polymer and those of the microparticles. This may be done, for example, by including, in the monomers from which the auxiliary polymer is derived, a monomer carrying groups which can react with residual reactive hydroxymethylamino or alkoxymethylamino groups in the amino resin; such a monomer may be a hydroxy monomer or a carboxy monomer, analogous to the reactive monomer used in the production of the microparticle proper.

When incorporating into the coating composition polymer microparticles which have been treated with an auxiliary polymer, it may be sufficient simply to add strong solvents to the dispersion of those treated microparticles, relying upon sufficient of the auxiliary polymer being dissolved away from the treated microparticles in order itself to provide the whole of the film-forming polymer constituent (A), whilst still leaving enough of that polymer associated with the microparticles to ensure their stabilisation. Alternatively, the dispersion of the treated microparticles may be blended with another film-forming polymer in the ways described above.

The polymer microparticles (C) are preferably present in the coating compositions of the invention in an amount of at least 2% by weight, more preferably at least 5% by weight, of the aggregate weight of the film-forming polymer (A) and the microparticles. For the purposes of this definition, the term "polymer microparticles" is to be understood as referring, in the case where auxiliary polymer is employed, to the microparticles proper together with that part of the auxiliary polymer associated therewith which cannot be dissolved away from the particles by the diluent (B).

The compositions used in the process of the invention may incorporate, in addition to the film-forming polymer (A), the diluent (B) and the polymer microparticles (C), pigments as conventionally used in the coatings art. Such pigments may range in particle size from 1 to 50 microns and may be inorganic in nature, for example titanium dioxide, iron oxide, chromium oxide, lead chromate or carbon black, or organic in nature, for example phthalocyanine blue, phthalocyanine green, carbazole violet, anthrapyrimidine yellow, flavanthrone yellow, isoindoline yellow, indanthrone blue, quinacridone violet and perylene red. Of particular interest in the context of the invention are metallic pigments consisting of flat flakes of aluminium, copper, tin, nickel or stainless steel, by the use of which there may be obtained the so-called "glamour metallic" finishes whereby a differential light reflection effect, depending upon the viewing angle, is achieved. Any of the above pigments may be present in the coating compositions in a proportion of from 2% to 50% of the aggregate weight of all the film-forming material present. The term "pigment" is here meant to embrace also conventional fillers and extenders, such as talc or kaolin.

Such pigments, whether metallic or otherwise, may be incorporated into the coating compositions with the aid of known dispersants, for example an acrylic polymer, which are compatible with the film-forming polymer (A).

If desired, the compositions may additionally incorporate other known additives, for example viscosity modifiers such as bentone or cellulose acetate butyrate.

As already indicated, there may further be incorporated a cross-linking agent to effect or assist the curing of the film-forming polymer (A), and also a suitable catalyst for the cross-linking reaction.

Coating compositions according to the invention may be applied to a substrate by any of the techniques known in the art, such as brushing, spraying, dipping or flowing, but spray application is of especial interest since the advantages conferred by the invention are then particularly apparent, as has been discussed above.

Any of the known spraying procedures may be used for applying the compositions, such as compressed air spraying, electrostatic spraying, hot spraying and airless spraying, and either manual or automatic methods are suitable. Under these conditions of application, coatings of excellent gloss are obtained which possess advantages over the coatings obtained according to the prior art in respect of the reduction of excessive flow on application, particularly at sharp edges or corners of a substrate of complicated shape, or the obliteration of scratch marks in the surface to be coated. Films of up to 4 mils dry thickness may be applied without any tendency for sagging, or "sheariness" due to inadequate control of the orientation of any metallic pigment present, to occur.

Following application of the composition to the substrate, in the case where the film-forming polymer (A) is of the thermoplastic type, volatilisation may be allowed to occur at room temperature or the coating may be subjected to an elevated temperature, for example of up to 160° C. Where the polymer (A) is of the thermosetting type, it will normally be necessary to subject the coating to treatment at an elevated temperature, e.g. 80° C. to 140° C., in order to bring about the cross-linking of the polymer, with the assistance of the cross-linking agent if also present.

Instead of using the coating composition of the invention for the production of a finish, or top-coat, it may be employed in a two-coat procedure commonly referred to as a "base-coat/clear-coat" procedure which is of special relevance to the production of the "glamour metallic" finishes referred to earlier. In this procedure there is first applied to the surface of the substrate a base-coat according to the invention containing the metallic pigment and formulated to give the maximum "flip" tone effect, and there is then applied over the base-coat and unpigmented top-coat which yields a high degree of gloss without in any way modifying the characteristics of the base-coat film. The unpigmented top-coat composition used in this procedure may be any of the compositions which are well known in the art to be suitable for that purpose; that is to say, there may be used as the film-forming polymer, for example, an acrylic polymer or a polyester resin of the kinds hereinbefore described, and that polymer or resin may be either in solution or in dispersion in a suitable carrier liquid. The film-forming polymer may be of either the thermoplastic or the thermosetting type, and in the latter case the top-coat composition will normally contain also a cross-linking agent, and optionally a catalyst, of the types described earlier. Where a heat treatment is required in order to cure the top-coat film, this operation may be utilised to bring about simultaneously any necessary curing of the base-coat film; alternatively, the base-coat film may be cured in a previous heat treatment step prior to the application of the top-coat.

The invention is illustrated but not limited by the following Examples, in which parts and percentages are by weight unless otherwise stated.

EXAMPLE 1

A. Preparation of Cross-linked Polymer Microparticles

To a vessel fitted with stirrer, thermometer and reflux condenser there was charged:

| | |
|---|---|
| Aliphatic hydrocarbon (boiling range 170-210° C., aromatics content 5%) | 21.48 parts |
| Hexane | 5.26 parts |
| Heptane | 28.13 parts |

The charge was heated to reflux temperature (100° C.) and the following pre-mixed reactants were then added:

| | |
|---|---|
| Methyl methacrylate | 1.73 parts |
| Methacrylic acid | 0.04 parts |
| Azodiisobutyronitrile | 0.14 parts |
| Graft copolymer stabiliser (33% solution, as described below) | 0.64 parts |

The reaction mixture was held at 100° C. for 30 minutes in order to form a "seed" dispersion of polymer particles. The following pre-mixed reactants were then added at a uniform rate over a period of 3 hours, whilst maintaining reflux, into the returning distillate:

| | |
|---|---|
| Methyl methacrylate | 27.95 parts |
| Melamine-formaldehyde resin ("Cymel"* 301 ex. Cyanamid of Great Britain Ltd). | 5.03 parts |
| Hydroxyethyl acrylate | 1.58 parts |
| Methacrylic acid | 0.67 parts |
| Graft copolymer stabiliser (33% solution, as described below) | 6.91 parts |
| Azodiisobutyronitrile | 0.44 parts |

*"Cymel" is a Registered Trade Mark.

The reactants were held at reflux temperature for a further 2 hours to complete conversion of the monomers. A fine particle-size dispersion of cross-linked acrylic polymer microparticles was obtained. The total solids content was 38.6% and the content of insoluble, cross-linked polymer was 30.5%.

The graft copolymer stabiliser used in the above procedure was obtained as follows. 12-Hydroxystearic acid was self-condensed to an acid value of about 31–34 mg KOH/g (corresponding to a molecular weight of 1650–1800) and then reacted with an equivalent amount of glycidyl methacrylate. The resulting unsaturated ester was copolymerised at a weight ratio of 2:1 with a mixture of methyl methacrylate and acrylic acid in the proportions of 95:5. The copolymer was used as a 33% solution in a mixture of aliphatic hydrocarbon, toluene and ethyl acetate in the ratio 74:14:12 parts by weight.

B. Modification of Microparticles with Auxiliary Polymer

To a vessel fitted as described in (A) above was charged:

| | |
|---|---|
| Microparticle dispersion as described in (A) above | 56.32 parts |
| Xylene | 14.97 parts |

This mixture was heated to reflux temperature and 2-4 parts of distillate were removed, the final reflux temperature being 112°–113° C. The following pre-mixed ingredients were then fed into the returning distillate at a constant rate over a period of 3 hours:

| | |
|---|---|
| Methyl methacrylate | 2.96 parts |
| Hydroxyethyl acrylate | 1.69 parts |
| Methacrylic acid | 0.44 parts |
| Butyl methacrylate | 3.27 parts |
| 2-Ethylhexyl acrylate | 3.38 parts |
| Styrene | 5.06 parts |
| tert-Butyl perbenzoate | 0.40 parts |
| prim-Octyl mercaptan | 0.19 parts |
| Graft copolymer stabiliser (33% solution, as described in (A) above | 1.32 parts |

On completion of the feed, the contents of the vessel were held at 115° C. for a further 2 hours to achieve full conversion of the monomers. There were then added:

| | | |
|---|---|---|
| Butyl alcohol | 3.01 | parts |
| Butyl acetate | 7.00 | " | to give a dispersion of cross-linked polymer microparticles modified with auxiliary polymer; the total solids content of the dispersion was 38.7% and the content of insoluble particles 21.0%.

C. Preparation of Paint Compositions (i) Preparation of Thermosetting Acrylic Coating Composition with Metallic Pigmentation The following sets of ingredients, as indicated in columns I and II respectively, were blended:

| | I | II | |
|---|---|---|---|
| Butylated melamine-formaldehyde resin (67% solution in butanol) | 46.62 | 46.62 | parts |
| Thermosetting acrylic polymer (65% solution as described below) | 91.86 | 124.47 | parts |
| Copper phthalocyanine blue dispersion (9.7% in xylene) | 23.7 | 23.7 | parts |
| Indanthrone blue dispersion (16.3% in xylene) | 4.8 | 4.8 | parts |
| Aluminum flake (coarse grade) (20% paste in xylene) | 18.6 | 18.6 | parts |
| Aluminum flake (fine grade) (20% paste in xylene) | 6.6 | 6.6 | parts |
| Modified microparticle dispersion (as described in (B) above). | 54.84 | — | parts |
| Silicone oil (10% solution in xylene) | 0.9 | 0.9 | parts |
| Butyl acetate | 16.4 | 23.0 | parts |
| Xylene | 16.3 | 23.0 | parts |
| Methyl ethyl ketone | 16.3 | 23.0 | parts |
| Dipentene | 9.0 | 9.0 | parts |

The resulting paint compositions I and II were both thinned with xylene to a viscosity of 35 seconds measured at 25° C. in a B.S. B3 cup. Four coats of each paint were applied wet-on-wet to primed metal panels, allowing a 1-minute flash-off period between coats. After a final 10-minute flash-off period the panels were stoved for 10 minutes at 130° C.

The control of the aluminium flake pigment, as manifested in freedom from "shear", absence of black edging effects and a more marked degree of "flip", was superior in the panel coated with composition I than in that coated with composition II.

The thermosetting acrylic polymer used in the above formulation was a copolymer of styrene, methyl methacrylate, butyl methacrylate, 2-ethylhexyl acrylate, hydroxy-ethyl acrylate and methacrylate acid in the proportions 30/15/17/20/15/3 respectively. It was employed as a 65% solution in a mixture of butyl acetate and aromatic hydrocarbon of boiling range 160°–180° C.

(ii) Preparation of Thermosetting Alkyd Coating Composition with Titanium Dioxide Pigmentation The following sets of ingredients, as indicated in columns I and II respectively, were blended:

|  | I | II |  |
|---|---|---|---|
| Butylated melamine-formaldehyde resin (62% solution in butanol) | 60.0 | 60.0 | parts |
| Millbase containing titanium dioxide (68.7% pigment with 6.6% dispersant resin in xylene) | 119.2 | 119.2 | parts |
| Alkyd resin solution (as described below) | 113.58 | 149.6 | parts |
| Modified microparticle dispersion (as described in (B) above). | 65.22 | — | parts |
| Silicone oil (10% solution in xylene) | 1.2 | 1.2 | parts |
| Dipentene | 20.0 | 20.0 | parts |
| Isobutanol | 8.0 | 8.0 | parts |
| Xylene | 60.0 | 85.0 | parts |

The compositions (I) and (II) above were applied by spray on to vertical primed steel panels which were punched with 0.25" diameter holes at 1" intervals, in such a way that the film thickness progressively increased from the top to the bottom of the panel. The applied coatings were allowed to flash off for 45 minutes and were then stoved at 130° C. for 10 minutes.

The film thickness at which sagging of the coatings at the rims of the holes occurred was then estimated. For the composition (I) containing polymer microparticles, the minimum film thickness was 0.0029"; for the composition (II) not containing the microparticles, the minimum film thickness was only 0.0019".

The alkyd resin used in the above formulation was a 34% oil length resin made by condensing coconut oil, trimethylolpropane, glycerol and phthalic anhydride in the molar proportions 1/4.05/0.5/5.14. The resin was used as a 70% solids solution in xylene.

EXAMPLE 2

A. Preparation of Cross-linked Polymer Microparticles

To a vessel fitted with stirrer, thermometer and reflux condenser there was charged:

| Aliphatic hydrocarbon (boiling range 170–210° C., | |
|---|---|

-continued

| aromatics content 5%) | 21.85 parts |
|---|---|
| Hexane | 5.35 parts |
| Heptane | 27.75 parts |

The charge was heated to reflux temperature (100° C.) and the following pre-mixed reactants were then added:

| Methyl methacrylate | 1.76 parts |
|---|---|
| Methacrylic acid | 0.04 part |
| Azodiisobutyronitrile | 0.14 part |
| Graft copolymer stabiliser (33% solution, as described in Example 1) | 0.65 part |

The reaction mixture was held at 100° C. for 30 minutes in order to form a "seed" dispersion of polymer particles. The following pre-mixed reactants were then added at a uniform rate over a period of 3 hours, whilst maintaining reflux, into the returning distillate:

| Methyl methacrylate | 24.87 parts |
|---|---|
| Benzoguanamine-formaldehyde resin ("Cymel" 1125 ex. Cyanamid of Great Britain Ltd, 85% solution in butoxyethanol) | 6.01 parts |
| Hydroxyethyl acrylate | 3.41 parts |
| Methacrylic acid | 0.68 part |
| Graft copolymer stabiliser (33% solution, as described in Example 1) | 7.03 parts |
| Azodiisobutyronitrile | 0.45 part |

The reactants were held at reflux temperature for a further 2 hours to complete conversion of the monomers. A fine particle-size dispersion of cross-linked polymer microparticles was obtained; the total solids content was 39.2% and the content of insoluble, cross-linked polymer was 29.1%.

B. Modification of Microparticles with Auxiliary Polymer

The procedure described in part B of Example 1 was repeated, but replacing the 56.32 parts of the microparticle dispersion obtained according to part A of Example 1 by an equal weight of the microparticle dispersion obtained as described in part A immediately above.

The dispersion thus obtained of cross-linked polymer microparticles modified with auxiliary polymer had a total solids content of 40.4% and an insoluble particle content of 24.4%.

EXAMPLE 3

A. Preparation of Cross-linked Polymer Microparticles

To a vessel fitted with stirrer, thermometer and reflux condenser there was charged:

| Aliphatic hydrocarbon (boiling range 170–210° C., aromatics content 5%) | 21.414 parts |
|---|---|
| Hexane | 5.245 parts |
| Heptane | 28.044 parts |

The charge was heated to reflux temperature (100° C.) and the following pre-mixed reactants were then added:

| | |
|---|---|
| Methyl methacrylate | 1.723 parts |
| Methacrylic acid | 0.036 part |
| Azodiisobutyronitrile | 0.137 part |
| Graft copolymer stabiliser (33% solution, as described in Example 1) | 0.642 part |

The raction mixture was held at 100° C. for 30 minutes in order to form a "seed" dispersion of polymer particles. The following pre-mixed reactants were then added at a uniform rate over a period of 3 hours, whilst maintaining reflux, into the returning distillate:

| | |
|---|---|
| Methyl methacrylate | 26.093 parts |
| Urea-formaldehyde resin ("Resimene"* 980 ex. Monsanto) | 5.020 parts |
| Hydroxyethyl acrylate | 3.380 parts |
| Methacrylic acid | 0.668 part |
| Graft copolymer stabiliser (33% solution, as described in Example 1) | 6.890 parts |
| Azodiisobutyronitrile | 0.708 part |

*"Resimene" is a Registered Trade Mark.

The reactants were held at reflux temperature for a further 2 hours to complete conversion of the monomers. A fine particle size dispersion of cross-linked polymer microparticles was obtained. The total solids content of the dispersion was 38.3% and the content of insoluble cross-linked polymer 33.8%.

B. Modification of Microparticles with Auxiliary Polymer

The procedure described in part B of Example 1 was repeated, but replacing the 56.32 parts of the microparticle dispersion obtained according to part A of Example 1 by an equal weight of the microparticles dispersion obtained as described in part A immediately above.

The dispersion thus obtained of cross-linked polymer microparticles modified with auxiliary polymer had a total solids content of 38.7% and an insoluble particle content of 21.0%.

EXAMPLE 4

A. Preparation of Cross-linked Polymer microparticles

To a vessel fitted with stirrer, thermometer and reflux condenser the following were added:

| | |
|---|---|
| Aliphatic hydrocarbon (boiling range 140–156° C.: zero aromatic content) | 22.452 parts |
| Methyl methacrylate | 1.172 parts |
| Methacrylic acid | 0.024 part |
| Azodiisobutyronitrile | 0.093 part |
| Graft copolymer stabiliser (33% solution, as described below) | 0.436 part |

The vessel and contents were purged with inert gas and the temperature then raised to 100° C. and held there for 1 hour in order to produce a disperse polymer "seed". The following ingredients were pre-mixed and were fed into the vessel at a uniform rate over a period of 6 hours, maintaining stirring and heating at 100° C.:

| | |
|---|---|
| Methyl methacrylate | 12.830 parts |
| Hydroxyethyl acrylate | 0.944 part |
| Methacrylic acid | 0.378 part |
| Azo-diisobutyronitrile | 0.122 part |
| Benzoguanamine-formaldehyde resin ("Cymel" 1125:85% solution in butoxyethanol) | 5.550 parts |
| Graft copolymer stabiliser solution (as described below) | 4.075 parts |
| Aliphatic hydrocarbon (boiling range 140–156° C.) | 9.922 parts |

The contents of the vessel were held at 100° C. for a further 2 hours; the temperature was then raised to 145° C. and held for 45 minutes to give full conversion of the monomers to a fine dispersion containing insoluble polymer gel microparticles (23–25% of the total dispersion) together with uncross-linked polymer particles (20% of the total dispersion).

The graft copolymer stabiliser solution used in the above procedure was obtained as follows. 12-hydroxystearic acid was self-condensed to an acid value of about 31–34 mg KOH/g (corresponding to a molecular weight of 1650–1800) and was then reacted with an equivalent amount of glycidyl methacrylate. The resulting unsaturated ester was copolymerised with methyl methacrylate and glycidyl methacrylate in the weight ratios 49:46:5 respectively, and the copolymer thus obtained was finally reacted with methacrylic acid and p-nitrobenzoic acid in the presence of a tertiary amine catalyst, in the proportions of 0.070 part of methacrylic acid and 0.109 part of p-nitrobenzoic acid for every 100 parts of the copolymer.

B. Modification of Microparticles with Auxiliary Polymer

To a vessel fitted as described in step (A) above, there were charged 57.998 parts of the dispersion obtained in step (A).

The dispersion was heated to reflux temperature (145° C.) and the vessel was purged with inert gas. The following ingredients were pre-mixed and were fed at a steady rate, over a period of 3 hours, to the returning reflux solvents. The refluxing rate was maintained so that the pre-mixed ingredients were always diluted by at least twice their amount of returning reflux solvent:

| | |
|---|---|
| Methyl methacrylate | 3.306 parts |
| Hydroxyethyl acrylate | 1.732 parts |
| Methacrylic acid | 0.450 part |
| Butyl acrylate | 3.355 parts |
| 2-Ethylhexyl acrylate | 3.464 parts |
| Styrene | 5.189 parts |
| Di-tertiary butyl peroxide | 0.344 part |
| Graft copolymer stabiliser (as described in (A) above) | 1.357 parts |

On completion of the addition, the contents of the vessel were held at reflux temperature (145° C.) for a further 2 hours to achieve full conversion of the monomers, and 18.030 parts of butyl acetate and 5.000 parts of 2-butoxyethanol were finally added, bringing the total charge to 100.000 parts. The dispersion so obtained of cross-linked polymer microparticles modified with auxiliary polymer had a total solids content of 38–40%; the content of insoluble, cross-linked particles was 22.0–22.5%.

C. Preparation of Thermosetting Acrylic Coating Composition

The following sets of ingredients, as indicated in columns I and II respectively, were blended:

|  | I | II |  |
|---|---|---|---|
| Butylated melamine-formaldehyde resin (65.3% solution in butanol) | 44.1 | 44.1 | parts |
| Titanium dioxide millbase (68.7% pigment with 6.6% dispersant resin in xylene) | 29.7 | 29.7 | parts |
| Yellow iron oxide millbase (49.4% pigment with 11.4% dispersant polymer in xylene) | 3.9 | 3.9 | parts |
| Thermosetting acrylic polymer (65% solution, as described in Example 1(C).) | 97.95 | 128.91 | parts |
| Modified microparticle dispersion (as described in (B) above.) | 51.96 | — | parts |
| Methyl ethyl ketone | 24.6 | 24.6 | parts |
| Dipentene | 18.0 | 18.0 | parts |
| Aromasol H* | 24.6 | 24.6 | parts |
| Flow-promoting polymer (10% solution in xylene) | 2.4 | 2.4 | parts |

*Registered Trade Mark for aromatic hydrocarbon, boiling range 165–195° C., Shell Chemical Company.

The resulting paint compositions I and II were both thinned with xylene to a viscosity of 24 seconds measured at 25° C. in a B.S. B4 cup. They were then applied by spray to primed steel panels containing 0.25" diameter holes in the manner described in Example 1 (C). For the composition (I) containing polymer microparticles, the film thickness at which sagging first occurred was 0.0035", whereas for the composition (II) containing no microparticles it was only 0.0024".

EXAMPLE 5

A. Preparation of Basecoat/Clearcoat Compositions containing Cross-linked Polymer Microparticles.

The following ingredients, as indicated in columns I, II, and III respectively, were blended to give three different basecoat compositions:

|  | I | II | III |  |
|---|---|---|---|---|
| Butylated melamine-formaldehyde resin (67% solution in butanol) | 13.74 | 13.74 | 13.74 | parts |
| Thermosetting acrylic polymer (65% solution as described in Example 1 (C).) | 27.84 | — | — | parts |
| Dispersion of carbazole violet (6.1% in xylene) | 3.66 | 3.66 | 3.66 | parts |
| Dispersion of phthalocyanine blue (9.7% in xylene) | 7.32 | 7.32 | 7.32 | parts |
| Dispersion of carbon black (14.2% in xylene) | 0.92 | 0.92 | 0.92 | part |
| Dispersion of aluminum flake (35.0% paste in xylene) | 29.31 | 29.31 | 29.31 | parts |
| Modified microparticle dispersion (as described in Example 1(B).) | — | 46.84 | — | parts |
| Modified microparticle dispersion (as described in Example 3(B).) | — | — | 48.31 | parts |
| 2-Ethoxyethyl acetate | 18.32 | 18.32 | 18.32 | parts |
| Butyl acetate | 6.40 | — | — | parts |

|  | I | II | III |  |
|---|---|---|---|---|
| The resulting compositions had the followin analyses:- | | | | |
| Total acrylic film-forming solids (as percentage of total resin solids) | 75.0 | 75.0 | 75.0 | parts |
| Insoluble cross-linked acrylic polymer solids (as percentage of total resin solids) | — | 26.6 | 33.5 | parts |
| Butylated melamine-formaldehyde resin solids (as percentage of total resin solids) | 25.0 | 25.0 | 25.0 | parts |

B. Coating Processes 100 parts of each of the base-coat compositions prepared in step (A) were thinned by addition of butyl acetate to give a viscosity of 22 secs. in a B.S. B.3 cup at 16% solids content. The thinned paints were applied by spray to primed metal panels so as to give films of thickness 0.0008" after loss of all solvents. After a 2-minute flash-off period at room temperature, the panels were over-coated with two coats of a thermosetting acrylic clear composition, a 2-minute flash-off period being allowed between coats. The dry film thickness of the clear coat was 0.0025". After a final flash-off period of 10 minutes at room temperature, the panels and coatings were stoved at 127° C. for 30 minutes.

The finishes thus obtained from basecoats II and III were of excellent appearance, having an even aluminium metal effect with no trace of movement of the metal flake (i.e. absence of "shear") and no "black edging". There was no sinkage of the clear top-coat into the base-coat, so that the very high gloss level associated with the clearcoat was in no way impaired by the base-coat, and yet there was excellent intercoat adhesion of the stoved panels. The coating also had good flexibility and humidity resistance.

In contrast, the finish obtained from basecoat I was of very poor appearance, having a patchy, uneven aluminium metal effect (i.e. "shear" was apparent) with a dull face tone and a very light colour when the panel was viewed at a low angle to the surface (i.e., absence of "flip"). At the sides of the panel dark pigmented areas ("black edging") were evident.

The acrylic clear composition used as the topcoat in the above procedure was made up as follows:

| Butylated melamine-formaldehyde resin, 60% solution in butanol | 22.0 | parts |
|---|---|---|
| Dipentene | 9.5 | parts |
| Butyl glycollate | 4.5 | parts |
| Butanol | 2.5 | parts |
| 2% solution of silicone oil | 0.4 | part |
| Non-aqueous dispersion in aliphatic/aromatic hydrocarbon mixture of thermosetting acrylic resin, 42% solids | 50.0 | parts |
| Solution of thermosetting acrylic resin, in xylene/butanol, 50% solids | 19.8 | parts |

The composition had a viscosity of 60 seconds when measured at 25° C. in a B3 cup according to B.S. 1733:1955.

We claim:

1. A process for the production of crosslinked addition polymer microparticles, comprising the dispersion polymerisation of ethylenically unsaturated monomers in an aliphatic hydrocarbon liquid which is a solvent for the monomers but is a non-solvent for the polymer produced, in the presence of a dispersion stabiliser the molecule of which comprises at least one polymeric component which is solvated by the hydrocarbon liquid and at least one other component which is not solvated by the liquid and is capable of associating with the polymer produced, characterised in that (i) there is present in the hydrocarbon liquid a reactive amino resin which is a condensate of formaldehyde with an amine group-containing substance which has subsequently been etherified by reaction with a lower alcohol so as to convert at least a proportion of the —NH.CH$_2$OH groups present into —NH.CH$_2$OR groups, where R is an alkyl group containing from 1 to 4 carbon atoms, the said etherified condensate having a mineral spirit tolerance of less than 100 as measured according to ASTM D1198-73 and a molecular weight of less than 2000 and which is insoluble in the hydrocarbon liquid and (ii) at least one of the ethylenically unsaturated monomers carries a group which is capable of reacting with the amino resin, the polymerisation conditions being so chosen that during the polymerisation of the monomer or monomers the said group reacts with the amino resin so as to effect cross-linking of the addition polymer chains.

2. A process as claimed in claim 1, wherein the ethylenically unsaturated monomers are alkyl esters of acrylic acid or methacrylic acid.

3. A process as claimed in claim 1 or claim 2, wherein the group capable of reacting with the amino resin is a hydroxyl group.

4. A process as claimed in claim 3, wherein the monomers being polymerised also include a monomer carrying a carboxyl group which is present in an amount of from 1% to 5% of the weight of the total monomer charge, the monomer carrying a hydroxyl group being present in an amount of from 1% to 20% of the same total weight.

5. A process as claimed in any one of claims 1 to 4, wherein the dispersion stabiliser is a block or graft copolymer containing one type of polymeric component consisting of polymer chains which are solvatable by the hydrocarbon liquid and another type of polymeric component consisting of polymer chains of different polarity from those of the first type which are not solvatable by the hydrocarbon liquid and are capable of becoming anchored to the polymer microparticles.

6. A process as claimed in claim 5, wherein the dispersion stabiliser is a graft copolymer comprising a polymer backbone, constituting the non-solvatable or anchor component, which is an acrylic polymer chain derived predominantly from methyl methacrylate and a plurality of solvatable polymer chains pendant from the backbone, each of which chains is the residue of poly(12-hydroxystearic acid).

7. A process as claimed in any one of claims 1 to 6, wherein the amino resin is employed in an amount of from 0.5% to 20% by weight of the total reaction constituents of the polymerisation mixture.

8. A process as claimed in any one of claims 1 to 7, wherein the amino resin is selected from hexamethoxymethylmelamine, tetramethoxymethylurea, tetramethoxymethylbenzoguanamine and the fully methylated low molecular weight further condensates of formaldehyde with melamine, urea or benzoguanamine.

9. A coating composition comprising (A) a film-forming polymer, (B) a volatile organic liquid in which the polymer is carried, and (C) crosslinked polymer microparticles, as claimed in any one of claims 1 to 8, which are insoluble in and stably dispersed in the combination of the polymer (A) and the diluent (B).

10. A coating composition as claimed in claim 9, wherein the polymer microparticles are associated with an auxiliary polymer which is insoluble in the liquid (B), is compatible with the polymer (A) and is produced by polymerisation in the dispersion of further monomer, in the original inert liquid medium and in the presence of the original stabilising agent, optionally with the addition of further stabilising agent.

11. A coating composition as claimed in claim 9 or claim 10, wherein the polymer microparticles are present in an amount of at least 2% of the aggregate weight of the film-forming polymer (A) and the polymer microparticles (C) as hereinbefore defined.

* * * * *